May 27, 1952 J. J. CARNEY Re. 23,503

PINKING SCISSORS

Original Filed Sept. 27, 1946

INVENTOR.
JAMES J. CARNEY.
BY Louis V. Lucia
ATTORNEY.

Reissued May 27, 1952

Re. 23,503

UNITED STATES PATENT OFFICE 23,503

PINKING SCISSORS

James J. Carney, deceased, late of Wethersfield, Conn., by The United Tool & Die Company, Elmwood, Conn., assignee Original No. 2,490,414, dated December 6, 1949, Serial No. 699,613, September 27, 1946. Application for reissue January 17, 1952, Serial No. 266,876

12 Claims. (Cl. 30—230)

Matter enclosed in heavy brackets [ ] appears in the original patent but forms no part of this reissue specification; matter printed in italics indicates the additions made by reissue.

This invention relates to pinking scissors and more particularly to such scissors as are intended for cutting sheet material such as cloth, or the like, and providing a pinked or staggered edge thereon which is especially suited for preventing unraveling of said material.

An object of this invention is to provide a pinking scissors of a novel construction whereby it is rendered durable, economical to manufacture, and highly efficient in its operation.

A further object of the present invention is to provide a pinking scissors having novel means associated with the cutting edge of the scissors for retaining the sheet material in proper position relatively thereto to be cut with a pinked edge having a series of sharply defined points.

Further objects and advantages of this invention will be more clearly understood from the following description and from the accompanying drawings, in which.

Figure 1:
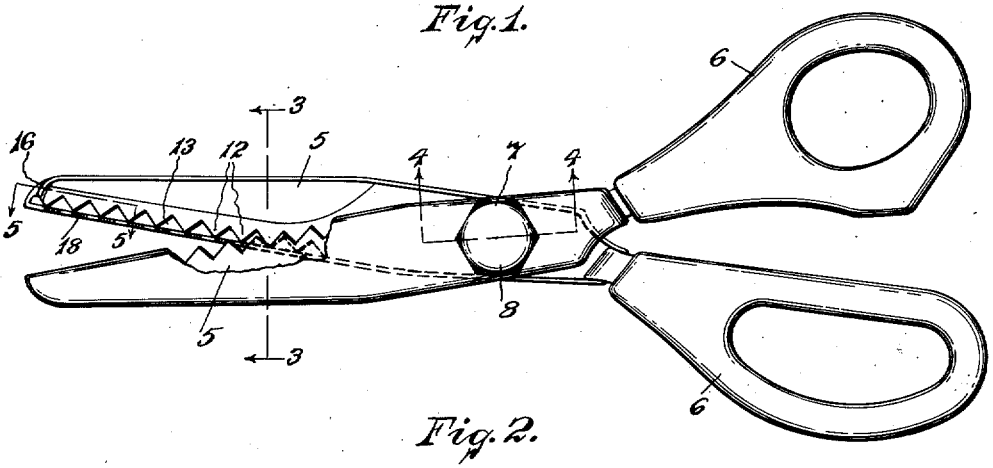
Fig. 1 is an elevational side view of a pinking scissors embodying my invention.
Figure 2:
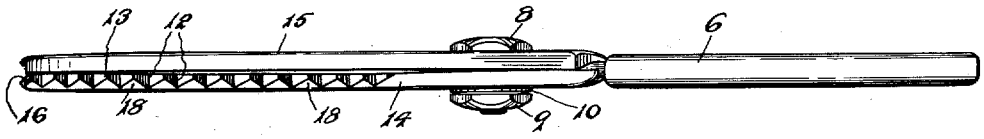
Fig. 2 is an elevational edge view of said scissors.

As shown in the drawings, my improved pinking scissors may comprise a pair of blades 5—5 having thereon suitable handles 6—6, the said blades being pivotally connected at 7 by means of a pivot screw 8 having a suitable nut 9 thereon with a spring washer 10 between said nut and the blades.

Figure 3:
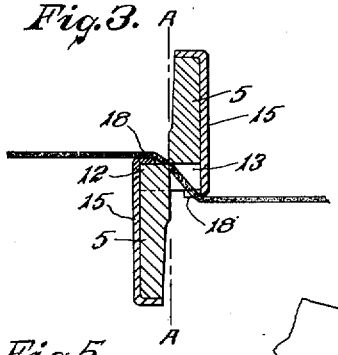
Fig. 3 is an enlarged view in vertical section on line 3—3 of Fig. 1.
Figure 4:
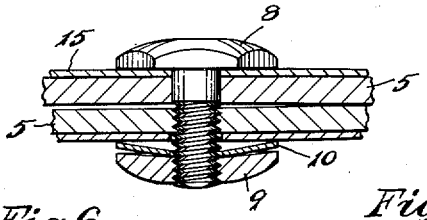
Fig. 4 is an enlarged sectional view of a portion of said scissors on line 4—4 of Fig. 1.

Each of the blades 5—5 has a flat side, which is substantially normal to the axis of the pivotal connection, and a transverse edge with a series of teeth 12 which are formed crosswise in the said edge of the blade to provide a serrated cutting edge and are positioned in the blades so that the high points of the teeth on [one] *each* blade and the low points of those on the opposite blade will be respectively on arcs having their centers substantially on the said axis of the pivotal connection and in register as clearly illustrated in Fig. 1 of the drawings. As shown in Fig. 3 of the drawings, it will be noted that the opposed sides of said blades are disposed parallel to each other on opposite sides of a central line indicated at A—A and that the notches forming the points of the teeth 12 are cut across the transverse edge of each blade as indicated at 13. It will also be noted that, during the operation of the scissors, the opposite rows of teeth move past each other and that the cutting edge on each blade runs along the sides of said teeth.

In order to retain the cloth, or sheet of material, which is to be cut, in position so that the said teeth will cut to leave sharply defined pinked edges, I provide a supporting surface by means of a flange 14 which preferably extends from a cover 15 on each blade and is disposed over and in front of the teeth 12 when the teeth on the opposite blades are moved relatively to each other during a cutting operation. The surfaces of the said flanges 14 will engage the sheet material, during the cutting operation and support it so that the scissors may be held perpendicularly to the plane of the cloth, in the conventional manner, and the portion of the sheet of material which is being cut will be disposed parallel to the sides of the teeth with the cutting edges thereon and the cut edge will thereby take the form of said teeth, as clearly shown in Fig. 7.

In order to prevent the accumulation of lint under the supporting flanges 14 and increase the efficiency of said scissors for cutting a pinked edge, I provide a series of notches in said flanges which are in register with the teeth 12 and form a row of teeth 18 that serve to engage the flexible material which is to be cut by said scissors and support the said material, as clearly illustrated in Fig. 3, so as to ensure the cutting of a pinked edge with uniform teeth therein.

Means other than the flange 14 may be provided for retaining the sheet material in position relatively to the teeth in the same manner as above described. Such means may be in the form of a guard secured to the front edge of the blades and running along said edge over the teeth 12, or such guard or flange may be provided in other forms so long as a supporting surface is provided adjacent to and running over the points of the teeth 12, as clearly described herein and illustrated in the drawings, for supporting the portion of the sheet material being cut so as to permit portions of said material to extend from the edge of the supporting surface to the cutting edge portion at the bottom of a tooth on one blade, while the supporting surface on the opposite blade supports the material so as to permit the [cloth] *material* to be cut with the cutting edge [portion] *portions* at the [top] *tops* of said teeth.

Figure 5:
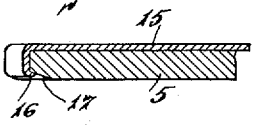
Fig. 5 is an enlarged sectional view of a portion of the end of one of the blades of said scissors on line 5—5 of Fig. 1.

If desired, the cover plates 15 may be secured as illustrated by mounting them between the head 8 or the nut 9 and their respective blade 5 for securing the plates thereon with supporting flanges 14 extending inwardly across the tops of the teeth 12 for a portion of the distance across the edges of the blades. The front ends of said cover plates may be bent backwardly, as at 16 in Fig. 5, to engage a beveled edge 17 so as to lock the end of the plate to the blade against displacement thereon and prevent said plate from moving away during cutting operations.

Figure 7:
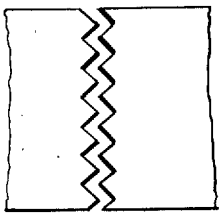
Fig. 7 is a fragmentary elevational view of a piece of sheet material showing a cut made with my improved scissors.
Figure 8:
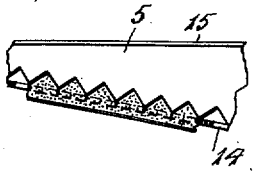
Fig. 8 is a fragmentary elevational view of a portion of a scissors blade showing a piece of sheet material being cut therewith.

During the operation of cutting a piece of sheet material, such as cloth or the like, the material is supported by means of the flanges 14, as clearly shown in Figs. 3 and 8, so that, as the blades are moved together, the portion of the material being cut is carried over the edges of the flanges 14 and between the cutting edges at the sides of the teeth 12, and a pinked edge will be cut as clearly illustrated in Fig. 7. While the illustration in Fig. 8 does not show the actual position of the material as it is being cut between the two blades, it illustrates the relation of the sheet with the cutting edge of the teeth which results in the formation of the points or pinked edges illustrated in Fig. 7.

Figure 6:
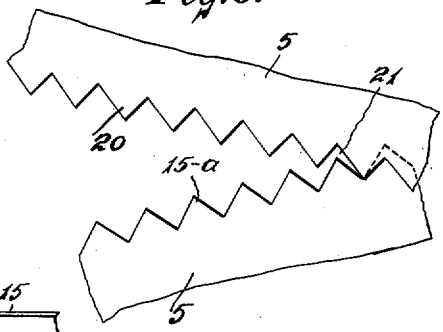
Fig. 6 is an enlarged fragmentary elevational view of opposite blade portions showing the formation of the cutting teeth therein.

It has also been found that in order to provide for efficient cutting operation of said scissors, it is of primary importance that the co-operating cutting edge portions on the opposite teeth be so formed that they will be relatively at an angle generally divergent in a direction away from the pivotal connection, so that the cutting point between the cutting edges of the blades will close progressively along the toothed formations of the opposite blades, and in a direction away from the pivotal point. To accomplish this purpose, the teeth on one of the blades 5 are preferably formed as clearly illustrated at 20 in Fig. 6 so that their movement, relatively to the teeth of the opposite blade, will bring the cutting edges past each other progressively along the toothed formation and without chopping action or jumps in the cutting as it is done by scissors. In other words, the actual cutting of the material will take place up the rear edge of the next tooth, down the front edge of that tooth, and so on for the full length of the blades. This is particularly illustrated at 21 which shows the tapered relation between the cutting edges of the opposite teeth whereby the said cutting edges will open forwardly from the point of contact between them and continue in this relation for the full length of the blades to provide maximum efficiency and prevent the points of the teeth on one blade from overriding the cutting edge of the opposite blade during the cutting operation.

While the teeth may be irregular, in order to properly register with those of the opposite blade, it will be noted from the illustration in Fig. 7 that the cut edges of the material will have uniform teeth therein. This is due to the fact that, during the relative movement between the blades, the actual cutting is influenced by the relative movement of the blades on the axis of the pivotal connection and thereby results in the cutting of uniform teeth irrespective of the irregularity in the actual shape of the said teeth. In other words, the relative movement of the blades brings the teeth 20 in balanced alignment with the teeth 15–a during the cutting operation so that uniform teeth will be cut along the pinked edge of the cut material.

It will be noted that the free edges of the flanges 14 are spaced from the actual [edge] *edges* of the blades so as to permit clearance between the said free edges and the inner surfaces of the opposite blades for accommodating the thickness of the material being cut, as clearly illustrated in Fig. 3.

The said plates 15 also provide an additional advantage since they cover the shear blades completely and thereby eliminate the necessity of a high polish on said blades which is more expensive in manufacture than a polished or finished surface directly on the blades.

I claim:

1. A pinking scissors comprising a pair of pivotally connected blades, each blade having a side substantially normal to the axis of the pivotal connection and an edge transverse to said side, and a series of teeth cut crosswise in the said transverse edge for providing a serrated cutting edge along the side of the blade; the said teeth having high points and low points, each high point of [one] *each* blade and the corresponding low point of the other blade being substantially in register and on an arc having a center substantially at the axis of the said pivotal connection.

2. A pinking scissors comprising a pair of pivotally connected blades, each blade having a side substantially normal to the axis of the pivotal connection and an edge transverse to said side, and a series of teeth cut crosswise in the said transverse edge and having high points and low points with cutting edge portions therebetween providing a serrated cutting edge along said blade; each high point of [one] *each* blade and the corresponding low point of the other blade being substantially in register and the said cutting edge portions of [one] *each* blade cooperating with corresponding portions of the other blade and forming therewith angles generally divergent away from the said pivotal connection.

3. A pinking scissors comprising a pair of pivotally connected blades, each blade having a side substantially normal to the axis of the pivotal connection and an edge transverse to said side, and a series of teeth cut crosswise in the said transverse edge and having high points and low points with straight cutting edge portions therebetween forming the sides of said teeth and providing a serrated cutting edge along the said blade; each high point of [one] *each* blade and the corresponding low point of the other blade being substantially in register and on an arc having its center substantially at the axis of the pivotal connection and each of said cutting edge portions of [one] *each* blade cooperating with the corresponding cutting edge portion of the other blade and generally diverging therefrom in a direction away from the said pivotal connection.

4. A pinking scissors comprising a pair of pivotally connected blades each having a side substantially normal to the axis of the pivotal connection and an edge transverse to said side, a series of teeth cut crosswise and providing a serrated cutting edge along the side of the blade, the said teeth having high points and low points, the high points of [one] *each* blade and the corresponding [blade] *low points* of the other *blade* being in register and on an arc having a center substantially at the center of said pivotal connection, and means extending over the said transverse edge for supporting a sheet of material while being cut in said scissors.

5. A pinking scissors comprising a pair of pivotally connected blades each having a side substantially normal to the axis of the pivotal connection and an edge transverse to said side, a series of [said] teeth cut crosswise in the said transverse edge and having high and low points with cutting edge portions therebetween providing a serrated cutting edge along said blade, each high point of one blade and the corresponding low point of the other blade being substantially in register and the said cutting edge portions of one blade corresponding with the said portions of the other blade and forming therewith angles generally divergent in a direction away from the said pivotal connection, a plate mounted to said blade, and a portion on said plate running along and over the said teeth for supporting a sheet of material relative to said cutting edge while being cut in said scissors.

6. A pinking scissors comprising a pair of pivotally connected blades each having an inner and an outer side substantially normal to the axis of the pivotal connection and an edge transverse to said inner side, a series of teeth cut crosswise in the said transverse edge and having high points and low [point] *points* with cutting edge portions therebetween providing a serrated cutting edge along said inner side of the blade; each high point of one blade and the corresponding low [points] *point* of the other being in register; the said cutting edge portions of one blade cooperating with the corresponding cutting edge portions of the other blade and generally diverging therefrom in a direction away from the said pivotal connection, and means on said blades providing a supporting surface extending over the said teeth for supporting a sheet of material perpendicular to the inner sides of the blades and causing the portion of said material being cut to be disposed parallel to said inner sides for producing a pinked edge along the line of cut made by said serrated cutting edge.

7. A pinking scissors of the character described comprising a pair of pivotally connected blades each having an inner side and an outer side substantially normal to the pivotal connection and an edge transverse to the said sides, a series of teeth cut crosswise in the said transverse edge and having high points and low points with straight cutting edge portions therebetween forming the sides of the teeth and providing a serrated cutting edge along the inner side of said blade; the corresponding low points of one blade and the high points of the other blade being substantially in register and each of said cutting edge portions of one blade cooperating with the corresponding cutting edge [portions] *portion* of the other blade and generally diverging therefrom away from the said pivotal connection, a cover plate mounted upon the outer side of said blade, and a portion on said cover plate extending over the said teeth for supporting a sheet of material perpendicular to said inner sides of the blades and causing the portion of said sheet being cut to be disposed parallel to the said inner sides for producing a pinked edge along a line of cut made by said serrated cutting edges.

8. A pinking scissors comprising a pair of pivotally connected blades, each blade having a side substantially normal to the axis of the pivoted connection and an edge transverse to said side, a series of teeth cut crosswise in said transverse edge for providing a serrated cutting edge along the side of the blade, and material supporting means extending across the tops of said teeth for supporting a material relatively to said teeth as it is being cut in said scissors.

9. A pinking scissors comprising a pair of pivotally connected blades each blade having a side substantially normal to the axis of the pivotal connection and an edge transverse to said side, a series of teeth cut crosswise in the said transverse edge for providing a serrated cutting edge along the side of the blade, and means providing a support running along each of said blades and over the tops of said teeth for supporting a sheet of material relatively to said teeth while being cut in said scissors.

10. A pinking scissors of the character described comprising a pair of pivotally connected blades, each blade having a side substantially normal to the axis of the pivotal connection and an edge transverse to said side, a series of teeth cut crosswise in the said transverse edge and providing a serrated cutting edge along the side of the blade, a cover secured to the outside of the blade, and a portion projecting from said cover and running over the tops of said teeth for supporting a sheet of material relatively to said teeth while it is being cut in said scissors.

11. A pinking scissors of the character described comprising a pair of pivotally connected blades each having a side substantially normal to the axis of the pivotal connection and an edge transverse to said side and running along the blade, a series of teeth cut crosswise in the said transverse edge and providing a serrated cutting edge along the said side of the blade, a flange projecting inwardly over the said transverse edge and running along the tops of said teeth, said flange having a series of notches therein to permit the egress of lint and forming teeth in said flanges in register with the teeth in the said transverse edge and disposed perpendicularly thereto for supporting a sheet of material relatively to the said cutting edge while it is being cut in said scissors.

12. A pinking scissors of the character described comprising a pair of pivotally connected blades each having an inner and an outer side substantially normal to the axis of said blade and an edge transverse to said sides, a series of teeth cut crosswise in the said transverse edge for providing a serrated cutting edge along the inner side of the blade, a cover mounted over the outer side of the blade, and a flange on said cover projecting inwardly over the tops of the teeth in the blade for supporting a sheet of material relatively to the said teeth while it is being cut in said scissors.

THE UNITED TOOL & DIE COMPANY,
*Assignee of James J. Carney, Deceased,*
By EDWARD J. CARNEY,
*President.*

(References on following page)

REFERENCES CITED

The following references are of record in the file of this patent or the original patent:

UNITED STATES PATENTS

| Number | Name | Date |
|---|---|---|
| 297,964 | Bateman | May 6, 1884 |
| 683,457 | Flowers | Oct. 1, 1901 |
| 1,466,193 | Schuster | Aug. 28, 1923 |
| 2,050,870 | Weidauer | Aug. 11, 1936 |

FOREIGN PATENTS

| Number | Country | Date |
|---|---|---|
| 544,955 | Germany | Feb. 24, 1932 |